US011438375B2

(12) United States Patent
Mutairi et al.

(10) Patent No.: US 11,438,375 B2
(45) Date of Patent: Sep. 6, 2022

(54) METHOD AND SYSTEM FOR PREVENTING MEDIUM ACCESS CONTROL (MAC) SPOOFING ATTACKS IN A COMMUNICATION NETWORK

(71) Applicant: SAUDI ARABIAN OIL COMPANY, Dhahran (SA)

(72) Inventors: Baraka Mutairi, Dhahran (SA); Wail Ghanmi, Dhahran (SA); Abdulmajeed Omair, Dhahran (SA); Khalifah Khalifah, Dhahran (SA); Baher Ramady, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 26 days.

(21) Appl. No.: 16/889,843

(22) Filed: Jun. 2, 2020

(65) Prior Publication Data

US 2021/0377297 A1    Dec. 2, 2021

(51) Int. Cl.
*H04L 9/40* (2022.01)
(52) U.S. Cl.
CPC ........ *H04L 63/1466* (2013.01); *H04L 63/101* (2013.01)
(58) Field of Classification Search
CPC .......................... H04L 63/1466; H04L 63/101
See application file for complete search history.

(56) References Cited

U.S. PATENT DOCUMENTS 7,234,163 B1   6/2007  Rayes et al.
9,276,953 B2   3/2016  Abidi et al.
(Continued)

FOREIGN PATENT DOCUMENTS

CN    101370019 A    2/2009
CN    102427462 A    4/2012
(Continued)

OTHER PUBLICATIONS

International Search Report and Written Opinion issued in corresponding International Patent Application No. PCT/US2020/040247, dated Feb. 18, 2021 (15 pages).
(Continued)

*Primary Examiner* — Joseph P Hirl
*Assistant Examiner* — Stephen T Gundry
(74) *Attorney, Agent, or Firm* — Osha Bergman Watanabe & Burton LLP

(57) ABSTRACT

A method for preventing Medium Access Control (MAC) spoofing attacks in a communication network may include obtaining, by a protection layer, a connecting request for connecting a terminal to the communication network. The method may include issuing, by the protection layer, a MAC authentication request to a Network Access Control (NAC) server, the MAC authentication request may be a request to determine whether a MAC address of the terminal is whitelisted. The method may include responding, by the NAC server, to the MAC authentication request of the protection layer by allowing the terminal to join the communication network based on whether the MAC address of the terminal is whitelisted. The method may include sending, by the NAC server, a log message to a log analyzer server, the log message including a result identifying whether the MAC address of the terminal is whitelisted.

16 Claims, 7 Drawing Sheets

(56) References Cited

U.S. PATENT DOCUMENTS

| | | | |
|---|---|---|---|
| 10,785,229 B2* | 9/2020 | Bolton | H04L 63/0876 |
| 10,791,116 B1* | 9/2020 | McCorkendale | H04L 67/327 |
| 10,862,864 B2* | 12/2020 | Grimm | H04L 63/145 |
| 10,958,662 B1* | 3/2021 | Sole | H04L 63/0853 |
| 10,992,671 B2* | 4/2021 | Isola | H04L 63/101 |
| 11,134,058 B1* | 9/2021 | Sole | H04W 12/12 |
| 2011/0107417 A1 | 5/2011 | Balay et al. | |
| 2015/0295915 A1 | 10/2015 | Xiu | |
| 2015/0312267 A1 | 10/2015 | Thomas | |
| 2017/0346853 A1* | 11/2017 | Wyatt | H04L 9/3265 |
| 2018/0103348 A1 | 4/2018 | Malone et al. | |
| 2018/0145986 A1 | 5/2018 | Chien | |
| 2018/0176210 A1* | 6/2018 | Comay | H04L 63/0876 |
| 2018/0295519 A1 | 10/2018 | Nandha Premnath et al. | |
| 2018/0375873 A1* | 12/2018 | Isola | H04L 63/0853 |
| 2019/0036879 A1* | 1/2019 | Isola | H04L 63/101 |
| 2019/0036925 A1* | 1/2019 | Isola | H04L 63/101 |
| 2019/0036942 A1 | 1/2019 | Isola | |
| 2019/0036950 A1 | 1/2019 | Isola et al. | |
| 2019/0036954 A1 | 1/2019 | Garcia et al. | |
| 2019/0312838 A1* | 10/2019 | Grimm | H04L 63/0209 |
| 2020/0037140 A1 | 1/2020 | Hassan et al. | |
| 2020/0067883 A1 | 2/2020 | Isola et al. | |
| 2020/0137054 A1* | 4/2020 | Isola | H04L 63/0236 |
| 2020/0137055 A1 | 4/2020 | Isola et al. | |
| 2020/0213352 A1* | 7/2020 | Fainberg | H04W 12/122 |
| 2020/0280568 A1* | 9/2020 | Bratspiess | H04L 63/1416 |
| 2020/0314655 A1* | 10/2020 | Jain | H04L 63/0236 |
| 2020/0358817 A1* | 11/2020 | Ahluwalia | H04L 63/1483 |
| 2021/0021572 A1* | 1/2021 | Bonczar | H04L 63/20 |
| 2021/0067547 A1* | 3/2021 | Hale | H04L 63/162 |
| 2021/0195412 A1* | 6/2021 | Kaushik | H04W 12/033 |
| 2021/0203521 A1* | 7/2021 | Konda | H04L 63/1425 |
| 2021/0273975 A1* | 9/2021 | Bhatt | H04L 63/1416 |

FOREIGN PATENT DOCUMENTS

| | | |
|---|---|---|
| CN | 107743108 A | 2/2018 |
| EP | 3010287 A1 | 4/2016 |
| WO | 2016049833 A1 | 4/2016 |

OTHER PUBLICATIONS

"End-of-Sale and End-of-Life Announcement for the Cisco Secure Network Server (SNS) 3415 and 3495 Appliances for Cisco ISE, NAC, and ACS Applications, EOL 10878, Cisco announces the end-of-sale and end-of life dates for the Disco Secure Network Server (SNS) 3415 and 3495 Appliances for Cisco ISE, NAC, and ACS Applications."; Cisco Systems, Inc.; Apr. 8, 2016; URL: <https://www.cisco.com/c/en/us/products/collateral/security/identity-services-engine/eos-eol-notice-c51-737032.pdf> (4 pages).

"Cisco NAC Web Agent, All Versions, PB739602, Cisco Announces the End-of-Life Dates for all Versions of the Cisco NAC Web Agent."; Cisco Systems, Inc.; Jan. 1, 2017; URL: <https://www.cisco.com/c/en/US/products/collateral/security/identity-services-engine/bulletin-c25-739602.pdf> (2 pages).

* cited by examiner

METHOD AND SYSTEM FOR PREVENTING MEDIUM ACCESS CONTROL (MAC) SPOOFING ATTACKS IN A COMMUNICATION NETWORK

BACKGROUND

Media Access Control (MAC) spoofing entails changing a computer's identity, for any reason, from the perspective of a given communication network. In particular, MAC spoofing is defined as changing a hardcoded MAC address of an endpoint device (i.e., a user terminal). The changing of the assigned MAC address may allow the bypassing of access control lists on the communication network by either hiding the endpoint device on the communication network or allowing the endpoint device to impersonate another endpoint device. MAC spoofing is done for legitimate and illicit purposes alike. In a case where MAC spoofing is done for an illicit purpose, the MAC spoofing may be considered an attack to the integrity of the communication network being infiltrated. Currently, while communication networks may provide security measures for identifying spoofing endpoint devices, there are no security measures that involve preventing MAC spoofing attacks by authenticating MAC addresses after the endpoint device has linked to the communication network. In other words, current security measurements do not attempt to evaluate the integrity of connected endpoint devices after the endpoint devices have been granted access to the communication network a first time.

SUMMARY

In general, in one aspect, embodiments disclosed herein relate to a method for preventing Medium Access Control (MAC) spoofing attacks in a communication network. The method includes obtaining, by a protection layer, a connecting request for connecting a terminal to the communication network. The method includes issuing, by the protection layer, a MAC authentication request to a Network Access Control (NAC) server, the MAC authentication request being a request to determine whether a MAC address of the terminal is whitelisted. The method includes responding, by the NAC server, to the MAC authentication request of the protection layer by allowing the terminal to join the communication network based on whether the MAC address of the terminal is whitelisted. The method includes sending, by the NAC server, a log message to a log analyzer server, the log message including a result identifying whether the MAC address of the terminal is whitelisted. The method includes extracting, by the log analyzer server, the MAC address from the log message. The method includes relaying, by the log analyzer, the MAC address extracted to an integrity checker for validating terminal data against a defined terminal profile.

In general, in one aspect, embodiments disclosed herein relate to a system for preventing Medium Access Control (MAC) spoofing attacks in a communication network. The system includes a protection layer that obtains a connecting request for connecting a terminal to the communication network, and issues a MAC authentication request to the communication network, the MAC authentication request being a request to determine whether a MAC address of the terminal is whitelisted. The system includes a Network Access Control (NAC) server that responds to the MAC authentication request of the protection layer by allowing the terminal to join the communication network based on whether the MAC address is whitelisted, and sends a log message to a log analyzer server, the log message including a result identifying whether the MAC address of the terminal is whitelisted and sends a log message to a log analyzer server, the log message including a result identifying whether the MAC address of the terminal is whitelisted. The system includes a log analyzer server that extracts the MAC address from the log message. The system includes an integrity checker that receives the MAC address extracted by the log analyzer server for validating terminal data against a defined terminal profile.

In general, in one aspect, embodiments disclosed herein relate to a communication network that includes network resources hosted in various nodes or various servers. The communication network includes a system for preventing Medium Access Control (MAC) spoofing attacks in the communication network. The system in the communication network includes a Network Access Control (NAC) server that responds to the MAC authentication request of the protection layer by allowing the terminal to join the communication network based on whether the MAC address is whitelisted, and sends a log message to a log analyzer server, the log message including a result identifying whether the MAC address of the terminal is whitelisted and sends a log message to a log analyzer server, the log message including a result identifying whether the MAC address of the terminal is whitelisted. The system in the communication network includes a log analyzer server that extracts the MAC address from the log message. The system in the communication network includes an integrity checker that receives the MAC address extracted by the log analyzer server for validating terminal data against a defined terminal profile.

Other aspects of the disclosure will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency.

DETAILED DESCRIPTION

Figure 1A:
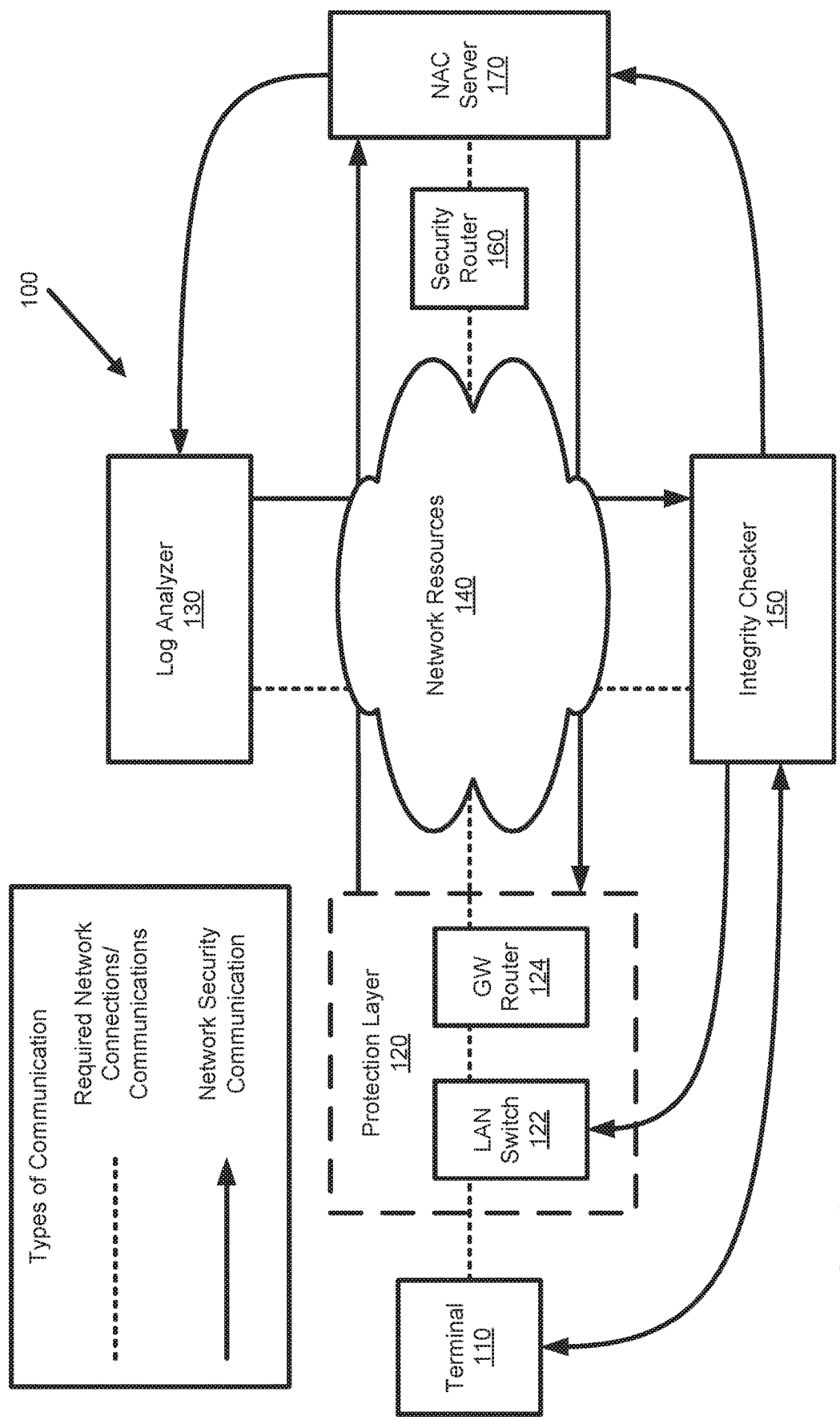
FIG. 1A shows a schematic diagram of a system in accordance with one or more embodiments.

Specific embodiments of the disclosure will now be described in detail with reference to the accompanying figures. Like elements in the various figures are denoted by like reference numerals for consistency.

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the disclosure include a method and a system for protecting against network layer-2 attacks (i.e., MAC spoofing as discussed above). The method and system provide an extra security layer for newly connected devices in a network (i.e., a communication network). In some embodiments, the newly connected device does not support 802.1x authentication mechanisms and uses MAC-based whitelisting via Network Access Control (NAC). The additional security layer provided by the system checks the authenticity and the integrity of any endpoint device or terminal, connected to the communication network by authenticating the terminal periodically and by blocking any MAC spoofed terminal, even when the terminal has been previously authenticated in the communication network.

As such, in some embodiments, the method and the system mitigate the risk of an attacker being able to spoof a MAC address and gain unauthorized access to the network by using an authentication request after allowing the terminal to join the network based on the terminal's capabilities. Specifically, the method and the system whitelist MAC addresses based on capability requirements and previous authentication results. The method and the system may provide records indicating whitelisted terminal to accelerate subsequent authentication attempts.

Further, the method and the system use an integrity checker server to validate new connected terminals against a defined profile for a device type. This profile includes physical and logical attributes of the terminal such as running services, serial number, usernames, and passwords. When the validation fails at any of the aforementioned steps, the device may be tagged as MAC spoofed. As such, this methodology forces a re-authentication request in new terminals and blocks previously allowed terminals when these devices fail the process or allow the devices to be connected when the process is successful.

FIG. 1A illustrates a system configuration for preventing MAC spoofing attacks in a communication network 100 in accordance to one or more embodiments. In particular, the system may be a defense system inside the communication network 100 that prevents spoofed terminal connections into the communication network 100. To this point, an attack is any successful connection and allocation of network resources to a spoofed terminal. As such, preventing an attack may involve any monitoring, identifying, and controlling of connections from terminals attempting to spoof into the communication network 100. According to one or more embodiments, FIG. 1A shows a terminal 110 connected to the communication network 100 through a protection layer 120 and attempting to access network resources 140 inside the communication network 100. FIG. 1A shows that the system exchanges security communications relating to the terminal 110. The system may evaluate terminal data to determine whether the terminal 110 is allowed to access the network resources 140. The system may include the protection layer 120, one or more security routers 160, a NAC server 170, a log analyzer 130, and an integrity checker 150. The system may be deployed across multiple physical locations. In some embodiments, the elements in the system may be executed on a single device with various physical layers and corresponding resources broken down to provide the functionality associated with each element in the system.

FIG. 1A shows various types of communication among the elements in the communication network 100. A type of communication may include required network connections/communications, such as established or soon-to-be-established communication links. In FIG. 1A, this type of communication is represented by dotted lines. Required network connections may include bandwidth allocation of resources in the communication network 100. These connections may be wired or wireless communication links based on minimum required exchanges between the elements in the communication network 100. As such, these connections may be feedback loops, control links, or data links required by the various elements in the communication network 100. Further, another type of communication may include network security communication, such as security-related data and/or control transmissions to prevent attacks to the communication network 100. In one or more embodiments, the network security communication may be performed by every element in the system upon identifying the terminal 110 attempting to connect to the communication network 100. In FIG. 1A, these exchanges are represented with solid arrows. The arrow exchanges will be explained in more detail with respect to FIG. 1B.

The terminal 110 may be hardware and software configured to exchange control signals, data signals, or information with a device connected to the communication network 100. For example, the terminal 110 may be the computer system 600 described in FIG. 6A below. The terminal 110 may have a known status or an unknown status with respect to the communication network 100. For example, the terminal 110 may have an unknown status with respect to the communication network 100 when the terminal 110 has not previously established a communication link with the communication network 100. Similarly, the terminal 110 may have a known status with respect to the communication network 100 when the terminal 110 has previously established a communication link with the communication network 100. Accordingly, with respect to the status of the terminal 110, the terminal 110 may be interpreted by the communication network 100 to be a spoofed terminal connection or a terminal connection that has been whitelisted in the communication network 100.

The protection layer 120 may include any exchange of local and network credentials. In particular, in one or more embodiments, the protection layer 120 may be a combination of a Local Area Network (LAN) switch 122 connected to the terminal 110 and a gateway (GW) router 124 connected to the communication network 100. In this case, the LAN switch 122 may be any node configured to exchange information with the terminal 110 and to allow routing of communications from the terminal 110 to any other devices or networks. The GW router 124 may be a counterpart to the LAN switch 122 located on the communication network 100. A such, the protection layer 120 may be any combination of elements coupled to connect the terminal 110 to the communication network 100.

The network resources 140 may be hardware and/or software configured to deliver one or more communication routes from the terminal 110 into the communication network 100. As such, the network resources 140 may be switches, routers, VLAN, DNS, and IP addresses. In some embodiments, the terminal 110 may communicate with a limited amount of network resources, including the GW router 124, upon engaging the protective layer 120. When the terminal 110 is determined to be whitelisted, the terminal 110 may be granted access to additional network resources. As discussed above, whitelisting may be a recording of any terminal information as terminal information approved to join the communication network 100. As it will be described below in more detail, whitelisting may change as time progresses or whitelisting may remain the same over a period of time. Overall, whether certain terminal information has been whitelisted may be a basis to determine access of the terminal 110 to any given amount of the network resources 140.

The security router 160 may be hardware and software configured to provide routing capabilities to communication signals transmitted within the communication network 100. In particular, the security router 160 may be a routing device configured for relaying or redirecting communications between two or more devices in the communication network 100. The security router 160 includes approval from the communication network 100 for exchanging these signals.

The NAC server 170 may be hardware and software configured to provide network security by unifying terminals (such as the terminal 110) connected to the communication network 100. In this regard, the NAC server may include user or system authentication and network security enforcement. The NAC server may be a computer providing networking solution that uses a set of protocols to define and implement policies that describes how to secure access to network nodes by terminals when they initially attempt to access the network. The NAC server may integrate the automatic remediation process (fixing non-compliant nodes before allowing access) into the network systems, allowing the network infrastructure such as routers, switches and firewalls to work together with back office servers and end user computing equipment to ensure information systems are operating securely before interoperability with a terminal is allowed. In some embodiments, the NAC server 170 establishes whether the terminal 110 includes a MAC address that has been whitelisted. In this case, the NAC server 170 may include a combination of reference information that indicates whether a MAC address has been previously whitelisted. Similarly, the NAC server 170 may identify whether the MAC address of the terminal 110 has been identified as MAC spoofed in previous connection attempts. In either instance, the NAC server 170 may relay information relating to the MAC address of the terminal 110 to the log analyzer 130 for upkeep of historical connection data. When the terminal 110 has never attempted connection, the NAC server 170 informs the log analyzer 130 that the MAC address includes an unknown state.

The log analyzer 130 may be hardware and software configured to monitor and analyze out-of-computer-generated records (also called log or audit trail records). The process of creating such records is called data logging. The log analyzer 130 may perform data logging to comply with security policies. In some embodiments, the log analyzer 130 may incorporate information about the terminal 110 to track connection attempts. In some embodiments, the log analyzer 130 may transfer the information relating to the MAC address to an integrity checker for authentication.

The integrity checker 150 may be hardware and software configured to compare the current state of stored data and/or programs to a previously recorded state in order to detect any changes. In some embodiments, the integrity checker 150 receives information relating to the MAC address of the terminal 110 and establishes a connection with the terminal 110. At this point, as it will be discussed in more detail in FIGS. 2-4, the integrity checker 150 may determine a sequence of checks to perform while connected to the terminal 110 based on whether the terminal 110 is determined to be whitelisted. Similarly, the integrity checker 150 may apply a connection challenge to the terminal 110 to further corroborate whether the MAC address is being spoofed.

Figure 1B:
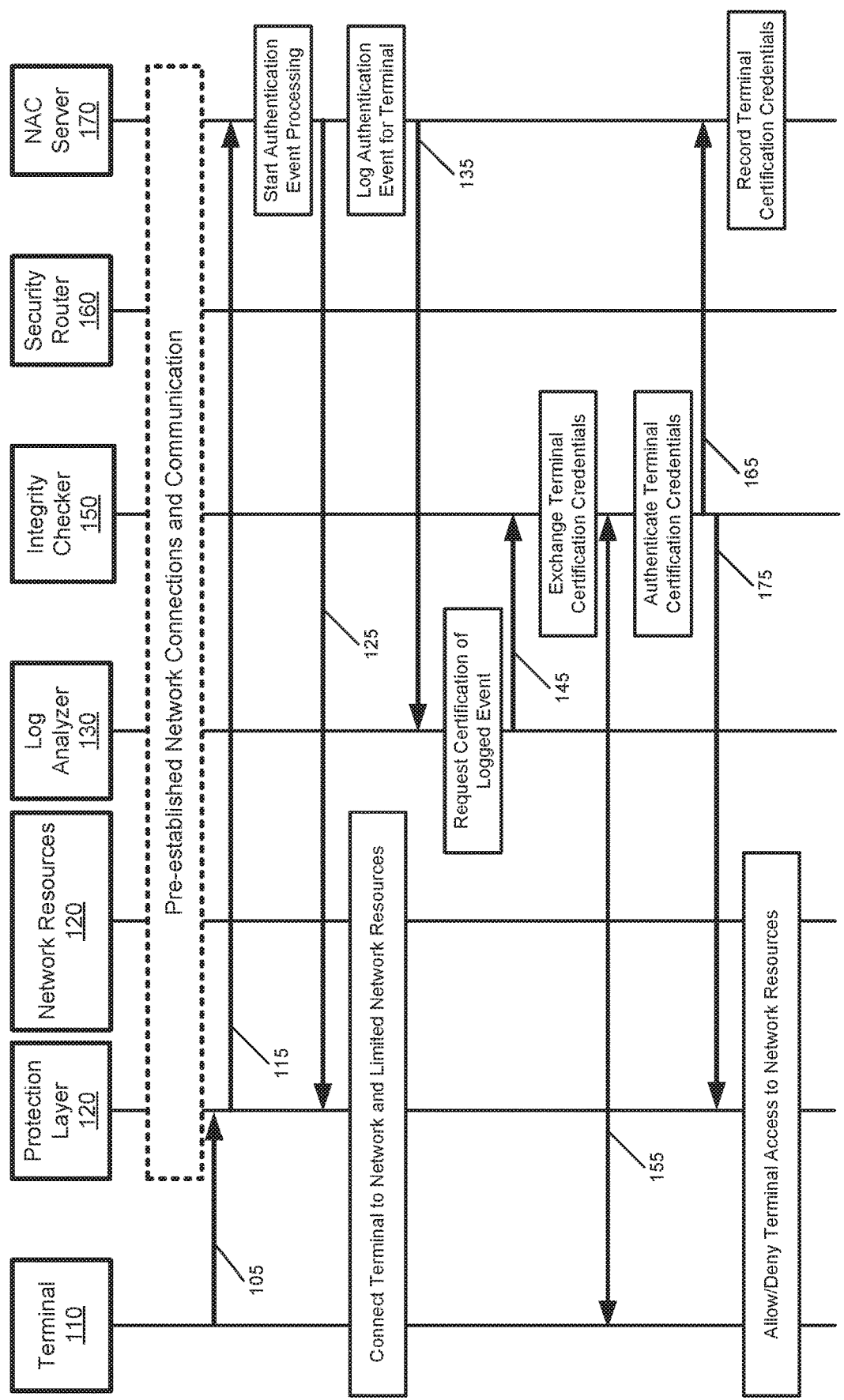
FIG. 1B shows a communication diagram of a system in accordance with one or more embodiments.

FIG. 1B illustrates a flow diagram detailing communication exchanges for a system preventing MAC spoofing attacks in a communication network 100 in accordance to one or more embodiments. In particular, the system may be the defense system inside the communication network 100 that prevents spoofed terminal connections into the communication network 100, as described with respect to FIG. 1A. In this case, the communication processes include the preventing exchanges, as shown by the multiple arrows. At an initial state, the elements described with respect to FIG. 1A are part of the communication network 100 including the pre-established network connections and communications shown as a dotted square at the top of the flow diagram. At any point, a communication 105 may occur from the terminal 110 to a protection layer 120 in which the terminal 110 requests access to the communication network 100. In communication 115, the protection layer 120 may send a MAC authentication request to the NAC server 170. At this stage, the NAC server 170 may start processing of an authentication event (i.e., start authentication event processing). The NAC server 170 identifies whether the MAC address includes a status of whitelisted, spoofed, or unknown. The NAC server 170 then transmits communication 125 which provides the protection layer 120 with an acknowledgement indicating that the MAC authentication process has started. In any event of identification of the terminal 110, the NAC server enables the protection layer 120 to allow connection of the terminal 110 to the communication network 100. The connection may be limited until the integrity checker 150 corroborates the status of the MAC address by applying the challenge.

Further, the NAC server 170 initiates a log authentication event for the terminal 110. In this event, the NAC server 170 collects and relays information regarding the MAC address to the log analyzer 130 in communication 135. At this point, the log analyzer 130 requests certification of the logged event and triggers an initiation of the challenge to corroborate the status of the MAC address. In communication 145, the trigger is sent to the integrity checker and the challenge is started. The challenge in this case is defined as a JADIR challenge, which stands for Jabber, Debrief, and Re-certification (JADIR). The challenge will be described in more detail with respect to FIGS. 2-4.

Upon triggering of the challenge in communication 145, the integrity checker 150 proceeds to exchange terminal certification credentials with the terminal 110 directly via bi-way communication 155. These terminal certification credentials may be information pertaining to physical attributes of data attributes of the terminal 110. These data attributes may be sampled periodically, over a period of time, and/or at different acquisition rates. That is, the integrity checker 150 may not receive all the requested data from the terminal 110 at once. In addition, while a connection may be established between the terminal 110 and the integrity checker 150, the connection may allow for other devices (not shown) to relay information and data from the terminal 110 to the integrity checker. For example, taking advantage of communication schemes such as carrier aggregation and/or dual connectivity may enable the terminal 110 and the integrity checker 150 to communicate more reliably in an event that the terminal 110 is identified to be in movement with respect to the communication network 100. Carrier aggregation schemes and dual connectivity schemes may be implemented for data exchanges as defined by Release 12 and subsequent releases of the 3GPP standard.

After exchanging certification credentials with the terminal 110, the integrity checker may arrive to a conclusion regarding the authenticity of the MAC address. Mainly, the integrity checker 150 may determine whether the MAC address is to be whitelisted. Irrespective of the authentication results, the integrity checker informs the NAC server 170 in communication 165 so the NAC server 170 may record or update the status of the MAC address and for the NAC server to record the terminal certification credentials relied on to arrive to the current authentication result. In addition, the integrity checker may provide communication 175 informing the protection layer 120 of the authentication results. In this case, when the MAC address is determined to be whitelisted, the terminal 110 is allowed access to the complete network resources. Alternatively, when the terminal 110 is determined to be spoofing, the terminal certification credentials are recorded as MAC spoofed and the terminal 110 is denied access to the network resources. In addition, while only one terminal 110 is shown, there may be various terminals connected to or attempting to connect to the network 100. In this case, the flow diagram of FIG. 1B may be performed for each terminal that is connected/connecting to the network either in parallel or in series While FIGS. 1A and 1B show various configurations of components, other configurations may be used without departing from the scope of the disclosure. For example, various components in FIGS. 1A and 1B may be combined to create a single component. As another example, the functionality performed by a single component may be performed by two or more components.

Figure 2:
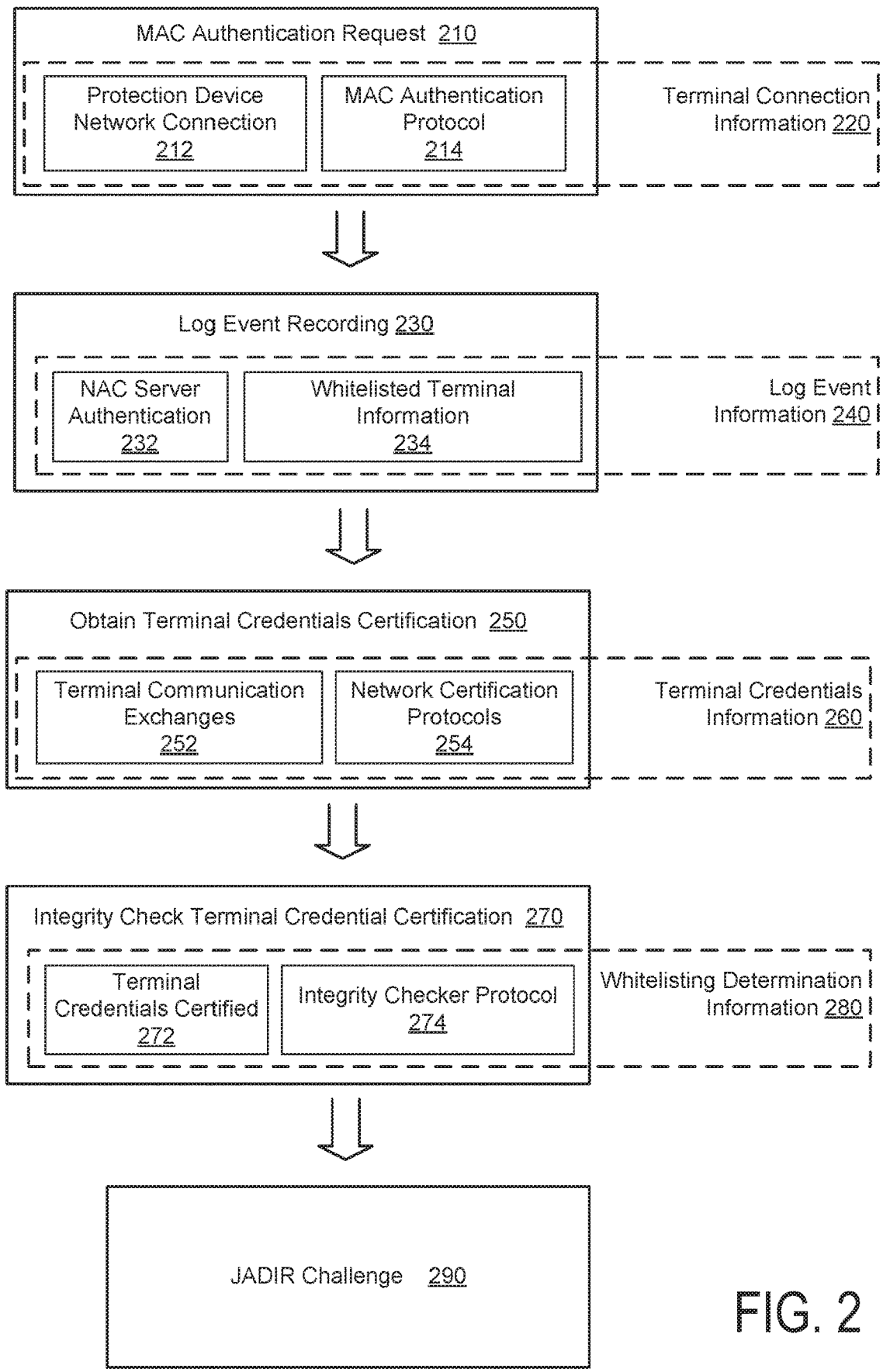
FIG. 2 shows an example in accordance with one or more embodiments.

FIG. 2 shows an example of generating the JADIR challenge based on the information collected throughout the MAC evaluation process described in relation to the system and communications illustrated in FIGS. 1A and 1B. In one or more embodiments, the integrity checker 170 validates newly connected terminals 110 (i.e., endpoints, endpoint terminals) against a defined profile using the JADIR challenge 290. This profile includes physical and logical attributes of the terminal such as running services, serial number, username, and/or passwords. If the validation fails at any step of the JADIR challenge 290, the terminal is tagged as MAC spoofed. JADIR is the Arabic word meaning trustworthy and expands into the following words: Jabber, Debrief, Inspect, and Re-certificate. In the challenge, Jabber includes initially chatting and verifying the MAC address of the terminal 110. Verifying may include checking any running opened ports, power Tx and/or Rx values from connected switches, response behavior of running services, or communication power levels. Further, Debrief includes issuing verification requests by authenticating directly the terminal using any combination of available communication protocols (i.e., HTTP, SSL, SNMP). To protect against theft of the passwords by an intruder, the integrity checker may test the authentication with two or more combinations of wrong/correct username and password. When the device fails correct authentication or vice versa, the integrity checker may inform the NAC server that this terminal is not authentic. Inspect includes deep inspection of terminal data by getting various physical or logical attributes of the terminal (i.e., serial number, chip number). The integrity checker 170 may label the device as MAC spoofed if one of the characteristics not correct. Finally, Re-certificate includes executing Jabber, Debrief, and Inspect periodically to mark the terminal 110 as authentic or as spoofed. In some embodiments, the integrity checker 170 may force re-authentication requests in newly connected terminals 110 and may block these terminals 110 when any of them fail the JADIR challenge or may allow terminals to remain connected when any of them are successful in the JADIR challenge.

The JADIR challenge may require information from one or more components described above. As such, information described below in relation to performing the JADIR challenge may be obtained from one or more devices in the communication network 100. Referring to both FIGS. 1B and 2, in some embodiments, a MAC authentication request 210 may be transmitted in communication 115 that requires a protection device network connection 212 and a MAC authentication protocol 214. For example, the protection device network connection 212 may provide terminal information relating to a location of connection of the LAN switch 122 and the GW router 124. Further, the MAC authentication protocol 214 may be a process established to authenticate terminal credentials relating to the MAC address. In this case, these components lead to obtaining terminal connection information 220 which is required by the NAC server 170 to identify a current status of the MAC address of the terminal 110. In terms of the JADIR challenge, Jabber relies on the terminal connection information 220 to obtain underlining protocol information relating to the communications network 100.

Once the terminal connection information 220 has been obtained, this information may be used to start a log event recording 230. The log event recording 230 may require NAC server authentication 232 and whitelisted terminal information 234, which may be used to obtain log event information 240. In this case, the NAC server authentication 232 may be a result from identifying whether the MAC address of the terminal 110 is whitelisted. The whitelisted terminal information 234 may further include credentials and certificates relating to MAC addresses that have been evaluated in past connections. In terms of the JADIR challenge, Debrief relies on the log event information 240 to obtain historical connection information relating to the terminal 110 and the terminal's interaction with the communication network 100.

The log event information 240 may be represented by communication 145, and the result may be triggering to obtain terminal credentials certification 250. In this case, it may be required to combine terminal communication exchanges 252 between the terminal 110 and the integrity checker 150 as described with respect to communication 175. Further, network certification protocols 254 may be obtained as part of the terminal credential certification. Once the terminal communication exchanges 252 and the network certification protocols 254 are obtained by the integrity checker 150, terminal credentials information 260 may be determined. In terms of the JADIR challenge, Debrief and Inspect rely on the terminal credential information 260 to obtain terminal certificates and profile terminal data that may be used for testing information relating to the terminal 110.

At this point, the integrity checker 150 may proceed to an integrity check terminal credential certification 270 in which whitelisting determination information 280 includes terminal credentials certified 272 and an integrity checker protocol 274. Both of these items are resulting from policies that the integrity checker 150 has set in place in coordination with the NAC server 170, as described above. In terms of the JADIR challenge, Inspect relies on the whitelisting determination information 280 to obtain information relating to a whitelisting status of the terminal 110. Once the aforementioned information has been obtained and/or calculated, the JADIR challenge 290 may proceed including all the required information.

Figure 3:
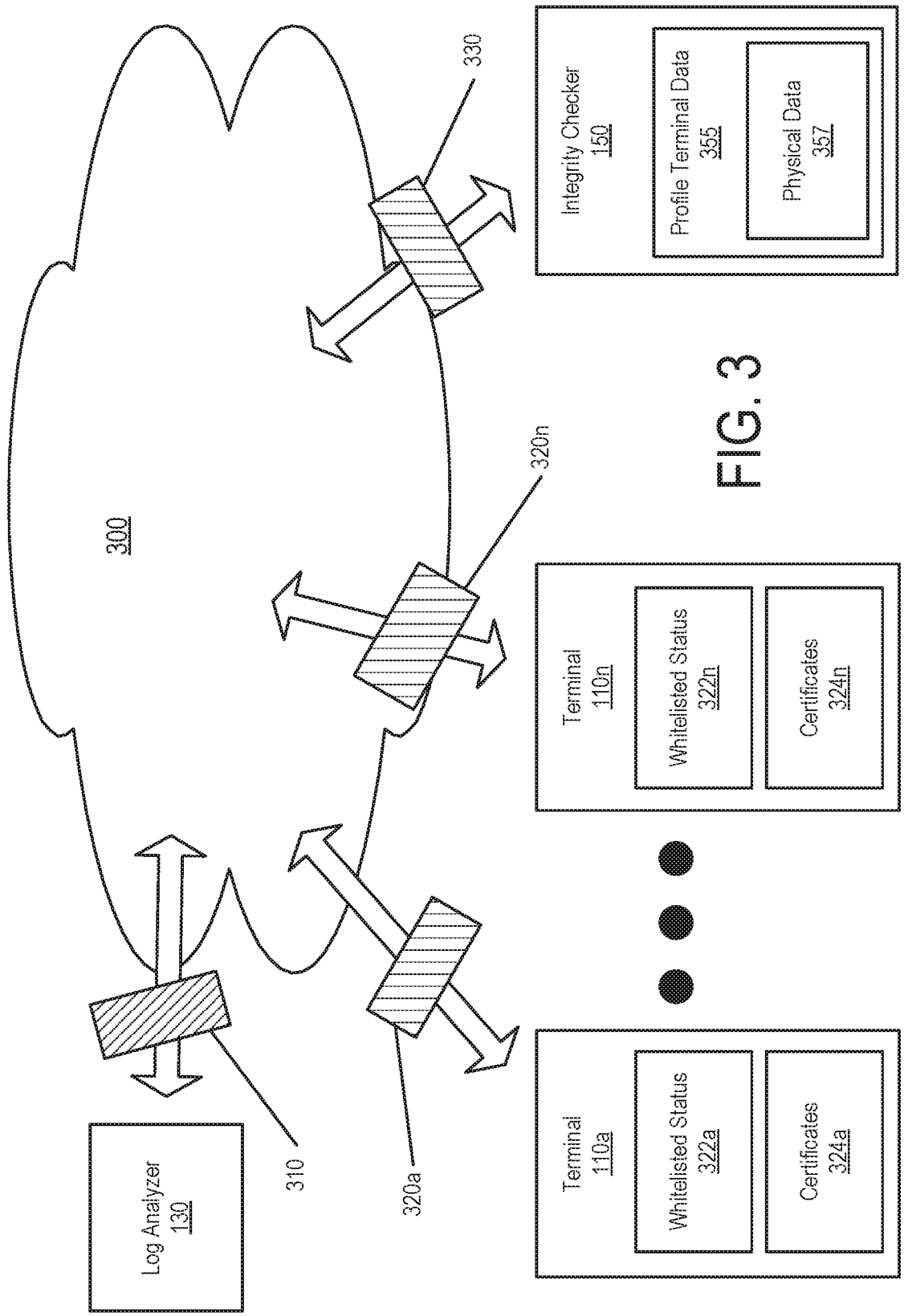
FIG. 3 shows an example in accordance with one or more embodiments.

In one or more embodiments, FIG. 3 shows various communications (for example, log analyzer communication 310, terminal communications 320a-320n, and integrity checker communication 330) distributed towards a pre-existing communication network 300. The pre-existing communication network 300 may be the communication network 100 as described with respect to FIGS. 1A-2. Similarly, the communications described above may be accommodated to exchange various communications simultaneously. As shown in FIG. 3, one log analyzer 130 and one integrity checker 150 may exchange information with the pre-existing communication network 400. Further, these devices may accommodate evaluating MAC addresses for various terminals 110a-110n simultaneously. Each of the terminals 110a-110n may include whitelisted status 322a-322n and certificates 324a-324n as described in reference to FIG. 4. Similarly, the integrity checker 150 may include the profile terminal data 355 further including the physical data 357 as described in FIG. 4.

Figure 4:
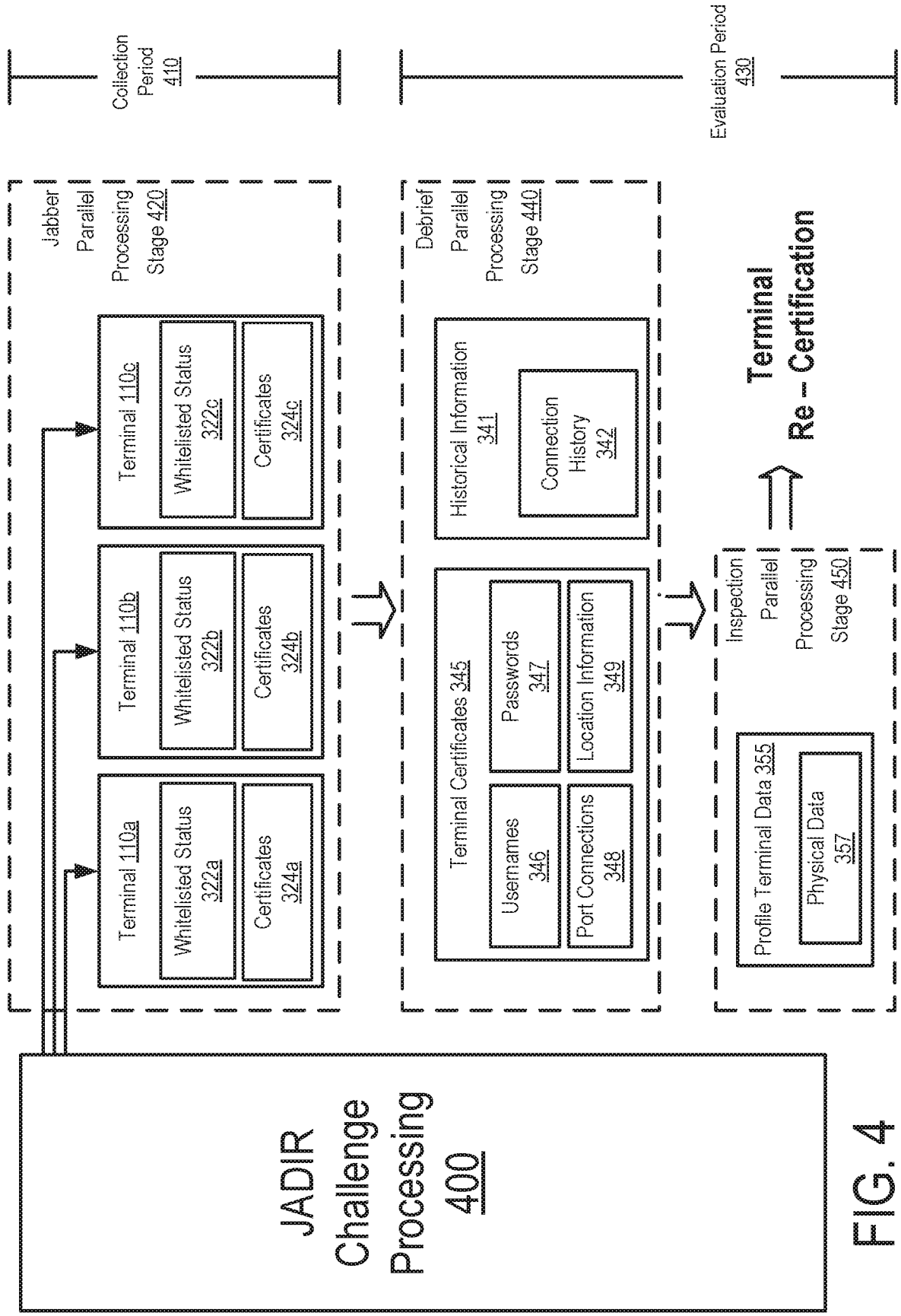
FIG. 4 shows an example in accordance with one or more embodiments.

FIG. 4 shows an example of implementing the JADIR challenge 290 according to one or more embodiments. FIG. 3 illustrates a parallel processing stage occurring simultaneously or in order as more than one terminal 110 may attempt to join the communication network 100. In some embodiments the JADIR challenge processing 400 may include a Jabber parallel processing stage 420, a Debrief parallel processing stage 440, and an Inspection parallel processing stage 450 to obtain a terminal re-certification. In particular, terminal re-certification may include re-certifying the status of a MAC address. In this case, the status of a MAC address may be modified or maintained through re-certification. The JADIR challenge allows for the status to be updated irrespective as to whether the terminal 110 is connected to the communication network.

In some embodiments, the Jabber parallel processing stage 420 requires identifying all terminals 110a-110c attempting to join the communication network 100. The terminals 110a-110c may each include a current whitelisted status 322a-322c (i.e., whitelisted, MAC spoofed, or unknown) and certificates 324a-324c. In this case, certificates 324a-324c may refer to information providing the terminal certificates 345. In the Debrief parallel processing stage 440, the terminal certificates 345 for all of the terminals 110a-110c may be joined together for comparison with historical information 341 of previous statuses and/or a list of whitelisted MAC addresses. The terminal certificates 345 may include usernames 346, passwords 347, port connections 348, and location information 349 from each terminal 110a-110c. Similarly, the historical information 341 may include connection history 342 for each terminal 110a-110c. Finally, once the information from the terminals has been aggregated and evaluated against past connection attempts, the inspection parallel processing stage 450 may process the aggregated information against profile terminal data 355 including physical data 357 required from each terminal 110a-110c. The required data may be data needed to confirm whether a MAC address is to be whitelisted. Similarly, the data may be needed to identify a profile corresponding to specific network resources.

In some embodiments, a JADIR challenge is divided into one or more obtaining periods (i.e., collection period 410) and/or one or more releasing periods (i.e., evaluation period 430). In the obtaining periods, data is collected by the various processing means from each terminal and this data is relayed by their associated protection layer 120. In the releasing periods, processed data may be organized into one or more aggregated packets representing the status of a MAC address in real time such that the status of the various MAC addresses may be constantly updated (i.e., performing terminal re-certification over a period of time in real time).

Figure 5:
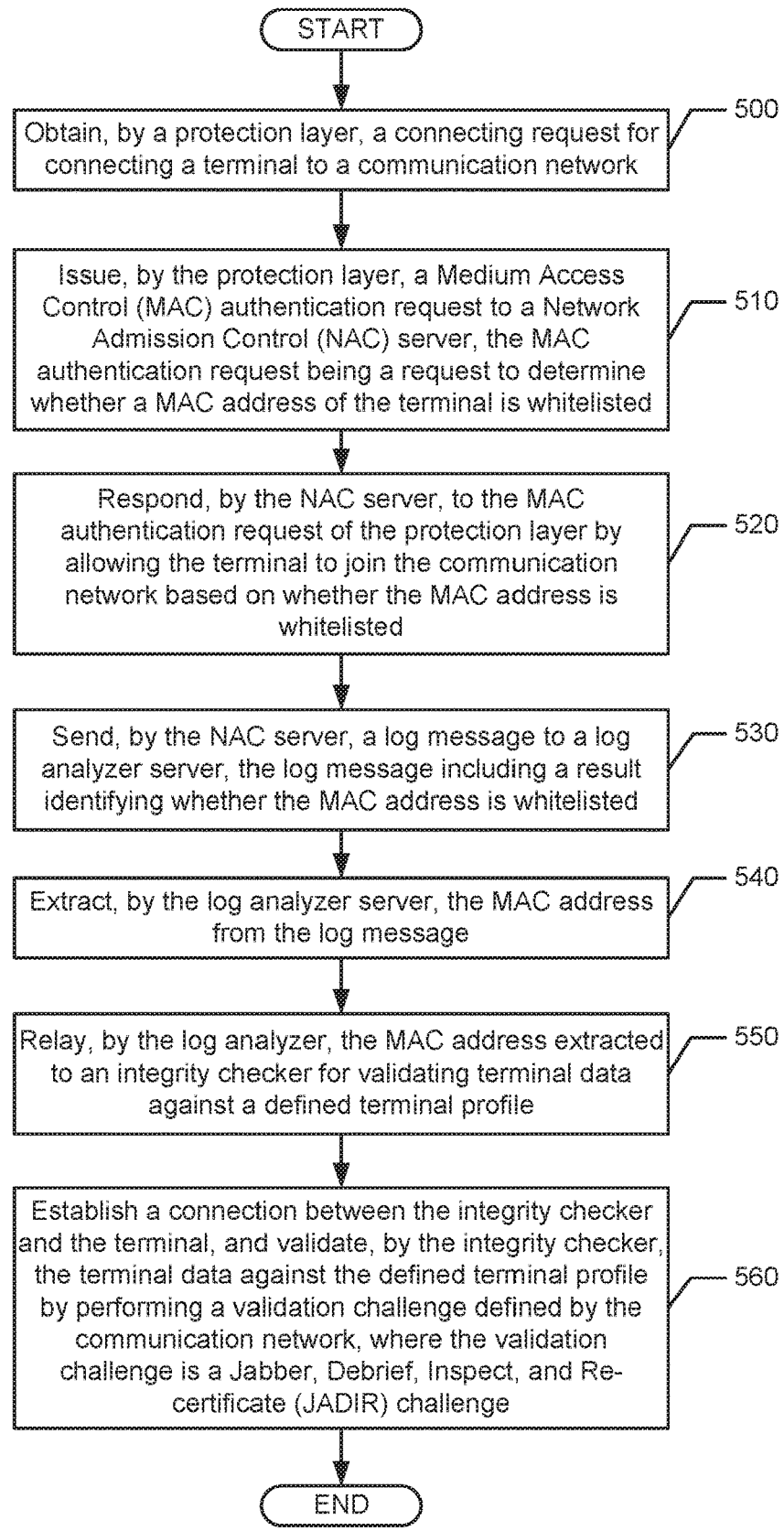
FIG. 5 shows a flowchart in accordance with one or more embodiments.

FIG. 5 shows a flowchart in accordance with one or more embodiments. Specifically, FIG. 5 describes a method for preventing Medium Access Control (MAC) spoofing attacks in a communication network. One or more blocks in FIG. 5 may be performed by one or more components as described above in FIGS. 1A and 1B (e.g., integrity checker 150). While the various blocks in FIG. 5 are presented and described sequentially, one of ordinary skill in the art will appreciate that some or all of the blocks may be executed in different orders, may be combined or omitted, and some or all of the blocks may be executed in parallel. Furthermore, the blocks may be performed actively or passively.

In Block 500, a protection layer obtains a connecting request for connecting a terminal to a communication network. For example, terminals may connect to the communication network. in this case, a LAN switch may issue a MAC authentication request for this terminal to a centralized NAC server.

In Block 510, the protection layer issues a MAC authentication request to a NAC server. The MAC authentication request is a request to determine whether a MAC address of the terminal is whitelisted. For example, the NAC server may respond to the request from Block 500 and may allow the terminal to join the communication network based on the MAC address of the terminal provided by the LAN switch, or deny the request when the MAC address of the terminal is not whitelisted.

In Block 520, the NAC server responds to the MAC authentication request of the protection layer by allowing the terminal to join the communication network based on whether the MAC address is whitelisted. That is, the NAC server may send a log message to the log analyzer server, which analyzes the log message, and extracts the MAC address from the log message.

In Block 530, the NAC server sends a log message to a log analyzer server. The log message includes a result identifying whether the MAC address is whitelisted.

In Block 540, the log analyzer server extracts the MAC address from the log message.

In Block 550, the log analyzer relays the MAC address extracted to an integrity checker for validating terminal data against a defined terminal profile.

In Block 560, a connection is established between the integrity checker and the terminal. At this point, the integrity checker validates the terminal data against the defined terminal profile by performing a validation challenge defined by the communication network. In this case, the validation challenge is a Jabber, Debrief, Inspect, and Re-certificate (JADIR) challenge.

Figure 6A:
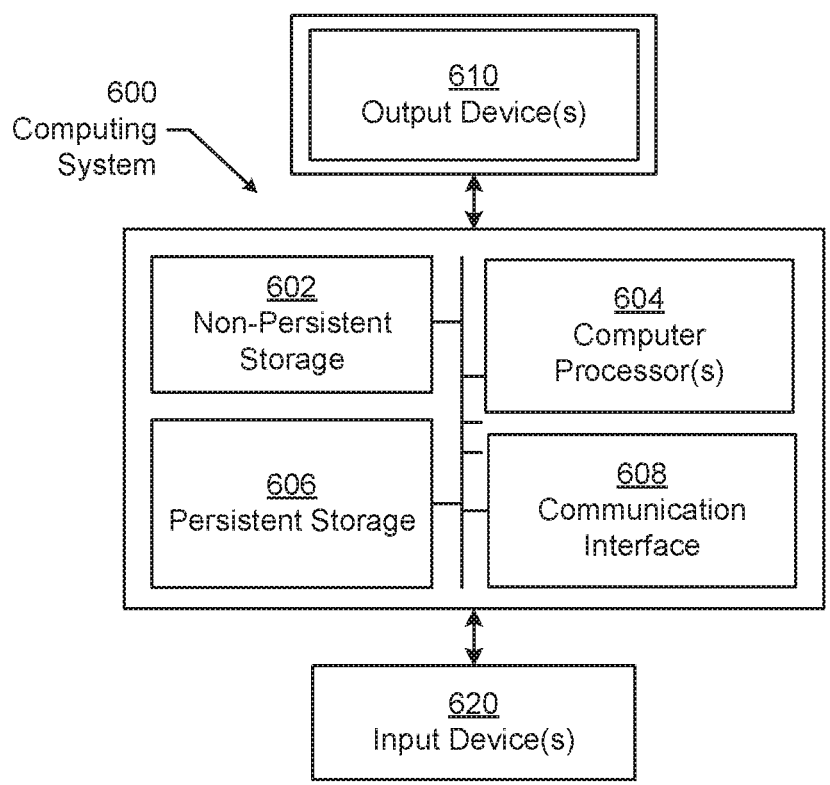
FIGS. 6A and 6B show a computer system and a network system in accordance with one or more embodiments.

Embodiments of the invention may be implemented on virtually any type of computing system, regardless of the platform being used. For example, the computing system may be one or more mobile devices (e.g., laptop computer, smart phone, personal digital assistant, tablet computer, or other mobile device), desktop computers, servers, blades in a server chassis, or any other type of computing device or devices that includes at least the minimum processing power, memory, and input and output device(s) to perform one or more embodiments of the invention. For example, as shown in FIG. 6A, the computing system 600 may include one or more computer processor(s) 604, non-persistent storage 602 (e.g., random access memory (RAM), cache memory, flash memory, etc.), one or more persistent storage 606 (e.g., a hard disk, an optical drive such as a compact disk (CD) drive or digital versatile disk (DVD) drive, a flash memory stick, etc.), and numerous other elements and functionalities. The computer processor(s) 604 may be an integrated circuit for processing instructions. For example, the computer processor(s) 604 may be one or more cores, or micro-cores of a processor. The computing system 600 may also include one or more input device(s) 620, such as a touchscreen, keyboard, mouse, microphone, touchpad, electronic pen, or any other type of input device. Further, the computing system 600 may include one or more output device(s) 610, such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system 600 may be connected to a network system 630 (e.g., a local area network (LAN), a wide area network (WAN) such as the Internet, mobile network, or any other type of network) via a network interface connection (not shown). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the invention.

Further, one or more elements of the aforementioned computing system 600 may be located at a remote location and be connected to the other elements over a network system 630. Further, one or more embodiments of the invention may be implemented on a distributed system having various nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

Figure 6B:
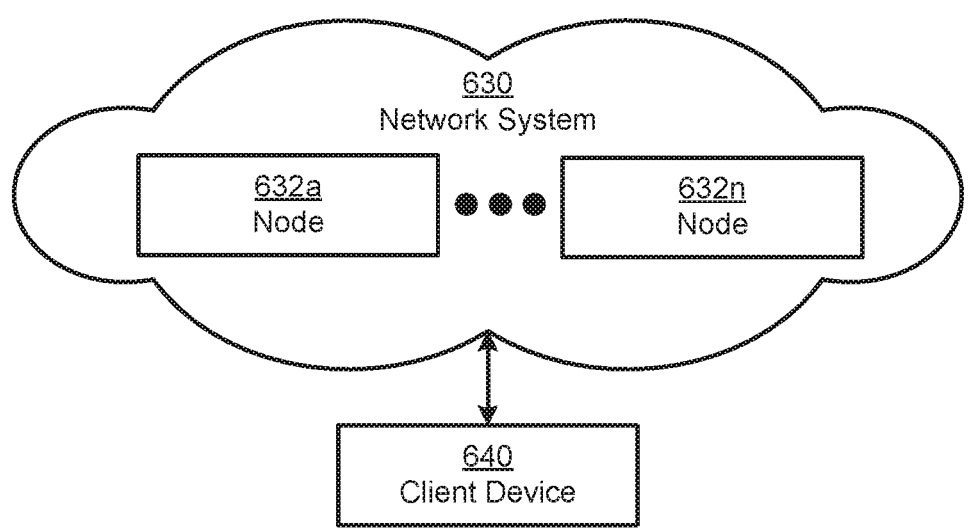

The computing system 600 in FIG. 6A may be connected to or be a part of a network. For example, as shown in FIG. 6B, the network system 630 may include multiple nodes (e.g., node 632a to node 634n). Each node may correspond to a computing system, such as the computing system shown in FIG. 6A, or a group of nodes combined may correspond to the computing system shown in FIG. 6A. By way of an example, embodiments of the disclosure may be implemented on a node of a distributed system that is connected to other nodes. By way of another example, embodiments of the disclosure may be implemented on a distributed computing system having multiple nodes, where each portion of the disclosure may be located on a different node within the distributed computing system. Further, one or more elements of the aforementioned computing system 600 may be located at a remote location and connected to the other elements over a network. As such, the aforementioned computing system 600 may be connected through a remote connection established using a 5G connection, such as a protocols established in Release 15 and subsequent releases of the 3GPP/New Radio (NR) standards.

Although not shown in FIG. 6B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node 632a to node 634n) in the network system 630 may be configured to provide services for a client device 640. For example, the nodes may be part of a cloud computing system, such as the communication network 100 described in FIGS. 1A and 1B. The nodes may include functionality to receive requests from the client device 640 and transmit responses to the client device 640. The client device 640 may be a computing system, such as the computing system shown in FIG. 6A. Further, the client device 640 may include and/or perform all or a portion of one or more embodiments of the disclosure.

The computing system or group of computing systems described in FIGS. 6A and 6B may include functionality to perform a variety of operations disclosed herein. For example, the computing system(s) may perform communication between processes on the same or different systems. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until the server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, one authorized process may mount the shareable segment, other than the initializing process, at any given time.

Other techniques may be used to share data, such as the various data described in the present application, between processes without departing from the scope of the disclosure. The processes may be part of the same or different application and may execute on the same or different computing system.

Rather than or in addition to sharing data between processes, the computing system performing one or more embodiments of the disclosure may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments of the disclosure, may extract one or more data items from the obtained data. For example, the extraction may be performed as follows by the computing system 600 in FIG. 6A. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail—such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as XML).

The extracted data may be used for further processing by the computing system. For example, the computing system of FIG. 6A, while performing one or more embodiments of the disclosure, may perform data comparison. Data comparison may be used to compare two or more data values (e.g., A, B). For example, one or more embodiments may determine whether A>B, A=B, A!=B, A<B, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if A>B, B may be subtracted from A (i.e., A−B), and the status flags may be read to determine if the result is positive (i.e., if A>B, then A−B>0). In one or more embodiments, B may be considered a threshold, and A is deemed to satisfy the threshold if A=B or if A>B, as determined using the ALU. In one or more embodiments of the disclosure, A and B may be vectors, and comparing A with B includes comparing the first element of vector A with the first element of vector B, the second element of vector A with the second element of vector B, etc. In one or more embodiments, if A and B are strings, the binary values of the strings may be compared.

The computing system in FIG. 6A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system of FIG. 6A may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions presents only a few examples of functions performed by the computing system of FIG. 6A and the nodes and/or client device in FIG. 6B.

Other functions may be performed using one or more embodiments of the disclosure.

While the disclosure has been described with respect to a limited number of embodiments, those skilled in the art, having benefit of this disclosure, will appreciate that other embodiments can be devised which do not depart from the scope of the disclosure as disclosed herein. Accordingly, the scope of the disclosure should be limited only by the attached claims.

What is claimed is:

1. A method for preventing Medium Access Control (MAC) spoofing attacks in a communication network, the method comprising:
   obtaining, by a protection layer, a connecting request for connecting a terminal to the communication network;
   issuing, by the protection layer, a MAC authentication request to a Network Access Control (NAC) server, the MAC authentication request being a request to determine whether a MAC address of the terminal is whitelisted;
   responding, by the NAC server, to the MAC authentication request of the protection layer by allowing the terminal to join the communication network based on whether the MAC address of the terminal is whitelisted;
   sending, by the NAC server, a log message to a log analyzer server, the log message comprising a result identifying whether the MAC address of the terminal is whitelisted;
   extracting, by the log analyzer server, the MAC address from the log message;
   relaying, by the log analyzer, the MAC address extracted to an integrity checker for validating terminal data against a defined terminal profile;
   establishing a connection between the integrity checker and the terminal; and
   validating, by the integrity checker, the terminal against the defined terminal profile by performing a validation challenge defined by the communication network,
   wherein the validation challenge is a Jabber, Debrief, Inspect, and Re-certificate (JADIR) challenge.

2. The method of claim 1, further comprising:
   establishing a connection between the terminal and network resources, the terminal comprising limited access to the network resources based on whether the MAC address of the terminal is whitelisted.

3. The method of claim 1, further comprising:
   validating, by the integrity checker, the terminal against the defined terminal profile by obtaining one or more terminal data attributes directly from the terminal and by comparing the one or more terminal data attributes obtained to a plurality of required attributes,
   wherein the defined terminal profile comprises the plurality of required attributes in a list form, an array form, or table form.

4. The method of claim 1,
   wherein Jabber comprises exchanging information with the terminal and obtaining information about the terminal,
   wherein Debrief comprises authenticating the information about the terminal using a communication protocol defined by the communication network,
   wherein Inspect comprises obtaining various physical terminal data attributes or various logical terminal data attributes from the information about the terminal, and
   wherein Re-Certificate comprises executing Jabber, Debrief and Inspect periodically.

5. The method of claim 4,
wherein Jabber further comprises testing open communication ports at the terminal, obtaining communication power levels at the protection layer, and tracking response behavior of running services at the terminal,
wherein Debrief further comprises informing the NAC server of the information about the terminal,
wherein Inspect further comprises determining whether the terminal is MAC-spoofed based on results from testing one or more of the various physical terminal data attributes or one or more of the various logical terminal data attributes, and
wherein Re-Certificate further comprises determining whether the terminal is authorized to communicate with the communication network and marking the terminal as authentic by whitelisting the MAC address.

6. The method of claim 1,
wherein the defined terminal profile comprises physical terminal data attributes or logical terminal data attributes.

7. The method of claim 6,
wherein the physical terminal data attributes comprise location information requirements battery power requirements, bandwidth capacity requirements, or historical connection requirements.

8. The method of claim 6,
wherein the logical terminal data attributes comprise serial number information, username information, password information, and running services resource allocation information.

9. A system for preventing Medium Access Control (MAC) spoofing attacks in a communication network, the system comprising:
a protection layer that:
obtains a connecting request for connecting a terminal to the communication network, and
issues a MAC authentication request to the communication network, the MAC authentication request being a request to determine whether a MAC address of the terminal is whitelisted;
a Network Access Control (NAC) server that:
responds to the MAC authentication request of the protection layer by allowing the terminal to join the communication network based on whether the MAC address is whitelisted, and
sends a log message to a log analyzer server, the log message comprising a result identifying whether the MAC address of the terminal is whitelisted;
a log analyzer server that extracts the MAC address from the log message; and
an integrity checker that
receives the MAC address extracted by the log analyzer server for validating terminal data against a defined terminal profile,
establishes a connection between the integrity checker and the terminal, and
validates the terminal against the defined terminal profile by performing a validation challenge defined by the communication network,
wherein the validation challenge is a Jabber, Debrief, Inspect, and Re-certificate (JADIR) challenge.

10. The system of claim 9,
wherein the terminal establishes a connection to network resources, the terminal comprising limited access to the network resources based on whether the MAC address of the terminal is whitelisted.

11. The system of claim 9, wherein the integrity checker further:
validates the terminal against the defined terminal profile by obtaining one or more terminal data attributes directly from the terminal and by comparing the one or more terminal data attributes obtained to a plurality of required attributes,
wherein the defined terminal profile comprises the plurality of required attributes in a list form, an array form, or table form.

12. The system of claim 9,
wherein Jabber comprises exchanging information with the terminal and obtaining information about the terminal,
wherein Debrief comprises authenticating the information about the terminal using a communication protocol defined by the communication network,
wherein Inspect comprises obtaining various physical terminal data attributes or various logical terminal data attributes from the information about the terminal, and
wherein Re-Certificate comprises executing Jabber, Debrief and Inspect periodically.

13. The system of claim 12,
wherein Jabber further comprises testing open communication ports at the terminal, obtaining communication power levels at the protection layer, and tracking response behavior of running services at the terminal,
wherein Debrief further comprises informing the NAC server of the information about the terminal,
wherein Inspect further comprises determining whether the terminal is MAC spoofed based on results from testing one or more of the various physical terminal data attributes or one or more of the various logical terminal data attributes, and
wherein Re-Certificate further comprises determining whether the terminal is authorized to communicate with the communication network and marking the terminal as authentic by whitelisting the MAC address.

14. The system of claim 9,
wherein the defined terminal profile comprises physical terminal data attributes or logical terminal data attributes.

15. The system of claim 14,
wherein the physical terminal data attributes comprise location information requirements battery power requirements, bandwidth capacity requirements, or historical connection requirements, and
wherein the logical terminal data attributes comprise serial number information, username information, password information, and running services resource allocation information.

16. A communication network comprising:
network resources hosted in a plurality of nodes or a plurality of servers;
a system for preventing Medium Access Control (MAC) spoofing attacks in the communication network, the system comprising:
a protection layer that:
obtains a connecting request for connecting a terminal to the communication network, the terminal attempting to access the network resources, and
issues a MAC authentication request to the communication network, the MAC authentication request being a request to determine whether a MAC address of the terminal is whitelisted;

a Network Access Control (NAC) server that:
  responds to the MAC authentication request of the protection layer by allowing the terminal to join the communication network based on whether the MAC address is whitelisted, and
  sends a log message to a log analyzer server, the log message comprising a result identifying whether the MAC address of the terminal is whitelisted;
a log analyzer server that extracts the MAC address from the log message; and
an integrity checker that
  receives the MAC address extracted by the log analyzer server for validating terminal data against a defined terminal profile,
  establishes a connection between the integrity checker and the terminal, and
  validates the terminal against the defined terminal profile by performing a validation challenge defined by the communication network,
  wherein the validation challenge is a Jabber, Debrief, Inspect, and Re-certificate (JADIR) challenge.

\* \* \* \* \*